US012652733B2

(12) United States Patent
Hsu et al.

(10) Patent No.: US 12,652,733 B2
(45) Date of Patent: Jun. 9, 2026

(54) LOCALIZED HEATING DEVICE AND LOCALIZED HEATING SYSTEM HAVING THE SAME

(71) Applicant: INDUSTRIAL TECHNOLOGY RESEARCH INSTITUTE, Hsinchu (TW)

(72) Inventors: Jui-Mei Hsu, Zhubei City (TW); Yo-Sung Lee, New Taipei (TW); Yi-Jiun Lin, Chiayi County (TW); Chih-Chiang Weng, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 800 days.

(21) Appl. No.: 18/076,545

(22) Filed: Dec. 7, 2022

(65) Prior Publication Data

US 2024/0098855 A1 Mar. 21, 2024

(30) Foreign Application Priority Data

Sep. 19, 2022 (TW) .................................. 111135358

(51) Int. Cl.
*H05B 7/02* (2006.01)
*H05H 1/00* (2006.01)
(Continued)

(52) U.S. Cl.
CPC ................. *H05B 7/02* (2013.01); *H05H 1/01* (2021.05); *B23K 10/003* (2013.01); *B23K 10/02* (2013.01); *H05H 1/24* (2013.01); *H05H 2245/80* (2021.05)

(58) Field of Classification Search
CPC ........ H05H 1/24; H05H 2245/80; H05H 1/01; B23K 10/02; B23K 10/003; H05B 7/02
(Continued)

(56) References Cited

U.S. PATENT DOCUMENTS 3,756,511 A * 9/1973 Shinroku ................. H05H 1/34
239/599
5,049,784 A * 9/1991 Matsudo ............... H01J 37/077
315/111.21
(Continued)

FOREIGN PATENT DOCUMENTS

CN 107207316 A 9/2017
CN 107207307 B 11/2020
(Continued)

OTHER PUBLICATIONS

Taiwan Patent Office, "Notice of Allowance", Nov. 1, 2023, Taiwan.
(Continued)

*Primary Examiner* — Jimmy Chou
(74) *Attorney, Agent, or Firm* — Troutman Pepper Locke LLP; Tim Tingkang Xia, Esq.

(57) ABSTRACT

A localized heating device includes a plasma deforming portion and a heating portion. The plasma deforming portion includes an inlet end having a circular hole, an outlet end having an elongated hole with a first length and a first width, and a channel smoothly connected with the circular hole and the elongated hole. The heating portion, disposed at the outlet end, includes two control covers spaced by a slot. The elongated hole and the slot being oppositely disposed with respect to the plasma deforming portion. A plasma flow provided by a plasma producing source being to enter the channel via the circular hole, then to flow through the elongated hole, and finally to reach the slot.

13 Claims, 13 Drawing Sheets

(51) Int. Cl.
| | | |
|---|---|---|
| *B23K 10/00* | (2006.01) | |
| *B23K 10/02* | (2006.01) | |
| *H05H 1/24* | (2006.01) | |

(58) Field of Classification Search
USPC .................................................... 219/121.48
See application file for complete search history.

(56) References Cited

U.S. PATENT DOCUMENTS

| | | | | |
|---|---|---|---|---|
| 5,628,924 | A | 5/1997 | Yoshimitsu et al. | |
| 5,679,167 | A * | 10/1997 | Muehlberger | C23C 4/134 |
| | | | | 219/121.48 |
| 6,197,026 | B1 | 3/2001 | Farin et al. | |
| 6,388,381 | B2 * | 5/2002 | Anders | H01J 37/32018 |
| | | | | 219/121.52 |
| 6,677,550 | B2 * | 1/2004 | Fornsel | H05H 1/34 |
| | | | | 219/121.5 |
| 6,926,946 | B2 | 8/2005 | Ogawa et al. | |
| 9,061,934 | B2 | 6/2015 | Bisson et al. | |
| 9,604,877 | B2 | 3/2017 | Veerasamy et al. | |
| 10,267,106 | B2 | 4/2019 | Foret | |
| 10,357,843 | B2 | 7/2019 | Barnes et al. | |
| 2004/0045319 | A1 | 3/2004 | Schussler et al. | |
| 2006/0172542 | A1 | 8/2006 | Bera et al. | |
| 2006/0179722 | A1 | 8/2006 | Spindler | |
| 2017/0197877 | A1 | 7/2017 | Veerasamy et al. | |
| 2022/0199372 | A1 * | 6/2022 | Suzuki | H01J 37/075 |

FOREIGN PATENT DOCUMENTS

| | | | | |
|---|---|---|---|---|
| CN | 112250284 | A | 1/2021 | |
| EP | 1162646 | A2 * | 12/2001 | ........ H01J 37/32541 |
| KR | 101221379 | B1 | 1/2013 | |
| TW | 200523517 | A | 7/2005 | |
| TW | 1242397 | B | 10/2005 | |
| TW | 1333225 | B | 11/2010 | |
| TW | I339143 | | 3/2011 | |
| WO | WO-2018185837 | A1 * | 10/2018 | .............. H05H 1/24 |
| WO | WO-2020021831 | A1 * | 1/2020 | .............. H05H 1/24 |

OTHER PUBLICATIONS

Sneha Samal et al., An Overview of Thermal Plasma Arc Systems for Treatment of Various Wastes in Recovery of Metals, Materials, 2022, 15, 683.

N. Z. A. Zabidi et al., A Brief Review on Atmospheric Air Plasma, Journal of Physics: Conference Series, 2021, 2071, 012004.

P.Hrma et al., Thermal Healing of Cracks in Glass, Journal of Non-Crystalline Solids, 102, 1988, 88-94.

Andrew A. Wereszczak et al., Glass Strengthening Via High-Intensity Plasma-Arc Heating, Journal of the American Ceramic Society, 2010, 93, 5, 1256-1259.

A. Schutze et al., The Atmospheric-Pressure Plasma Jet: A Review and Comparison to Other Plasma Sources, IEEE Transactions on Plasma Science, 1998, 26, 6.

Oleksiy V. Penkov et al., A review of recent applications of atmospheric pressure plasma jets for materials processing, Journal of Coatings Technology and Research,12, 225-235, 2015.

A. Berthold et al., Glass-to-glass anodic bonding with standard IC technology thin films as intermediate layers, Sensors and Actuators, 82, 2000, 224-228.

* cited by examiner

100A

W1A

G1A(G2A)

100B

W1B

G2B

G1B

LOCALIZED HEATING DEVICE AND LOCALIZED HEATING SYSTEM HAVING THE SAME

CROSS REFERENCE TO RELATED APPLICATION

This application claims the benefits of Taiwan application Serial No. 111135358, filed on Sep. 19, 2022, the disclosures of which are incorporated by references herein in its entirety.

TECHNICAL FIELD

The present disclosure relates in general to a heating technology, and more particularly to a localized heating device and a localized heating system having the localized heating device, with which stress cracking at a heated substrate due to temperature differences can be avoided while a part of the substrate is heated locally at high temperature and high speed to change properties thereof with other parts thereof being maintained at room temperature.

BACKGROUND

In the art, substrates used in various technical fields are presented in different forms. Generally, these substrates may be made of glass, ceramics, metals, and the like. In preparing a substrate, a raw material is cut into a required size, and then a plasma heat treatment process such as an edge treatment or a bonding step would be performed thereupon according to the needs of the process.

By having the edge treatment as an example, if the heating temperature is too high, temperature differences would occur between the directly heated part of the substrate and other parts of the substrate, from which thermal deformations or even cracking caused by the induced thermal stresses would be highly concerned.

By having the bonding process as another example, high voltages and heating are usually used. Such a process is both time-consuming and energy-consuming, and interlayer coating is sometimes required to achieve a better bonding strength. In this process, the associated production efficiency is usually poor, and the resulted yield is thus low. As such, the production cost is hard to be reduced. For example, a conventional glass substrate bonding is mostly performed by high temperature pressing for about 2-4 hours.

Further, the conventional substrate bonding is usually to heat the entire substrate, but cannot heat the substrate locally. Although a small number of known technologies can be applied to perform heating locally on the substrate, yet the heating temperature must be limited. If the heating temperature is too high, other parts of the substrate will be damaged or cracked due to heating temperature differences, and so many problems such as poor production efficiency and low yield would be induced.

Accordingly, how to develop "a localized heating device and a localized heating system having the same" that can locally heat the substrate at high temperature and high speed and change the properties of the substrate by leaving the other parts of the substrate maintained at room temperature without thermal stress cracking due to temperature differences is definitely urgent to be resolved to the skill in the related technical fields.

SUMMARY

In one embodiment of this disclosure, a localized heating device includes:

a plasma deforming portion, including:
  an inlet end, having a circular hole, connected with a plasma producing source;
  an outlet end, having an elongated hole, the elongated hole having a first length and a first width perpendicular to each other, the first length being parallel to a first direction, the first direction and an axis of the circular hole being perpendicular to each other; and
  a channel, smoothly connected with the circular hole and the elongated hole; and
a heating portion, including two control covers, the two control covers being spaced to each other by a slot having a first distance, the slot having a second length parallel to the first direction, the slot being parallel to the axis and having a second width, the heating portion being disposed at the outlet end of the plasma deforming portion, the first length and the second length being parallel to each other, the elongated hole and the slot being oppositely disposed, a plasma flow provided by the plasma producing source being to enter the channel via the circular hole, then to flow through the elongated hole, and finally to reach the slot.

In another embodiment of this disclosure, a localized heating system includes:

a plasma producing source, providing a plasma flow;
a localized heating device, including:
  a plasma deforming portion, including:
    an inlet end, having a circular hole, connected with a plasma producing source;
    an outlet end, having an elongated hole, the elongated hole having a first length and a first width perpendicular to each other, the first length being parallel to a first direction, the first direction and an axis of the circular hole being perpendicular to each other; and
    a channel, smoothly connected with the circular hole and the elongated hole; and
  a heating portion, including two control covers, the two control covers being spaced to each other by a slot having a first distance, the slot having a second length parallel to the first direction, the slot being parallel to the axis and having a second width, the heating portion being disposed at the outlet end of the plasma deforming portion, the first length and the second length being parallel to each other, the elongated hole and the slot being oppositely disposed, a plasma flow provided by the plasma producing source being to enter the channel via the circular hole, then to flow through the elongated hole, and finally to reach the slot; and
  a fixture, configured for loading a workpiece, driven to displace an edge of the workpiece to enter the slot for undergoing a plasma treatment.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
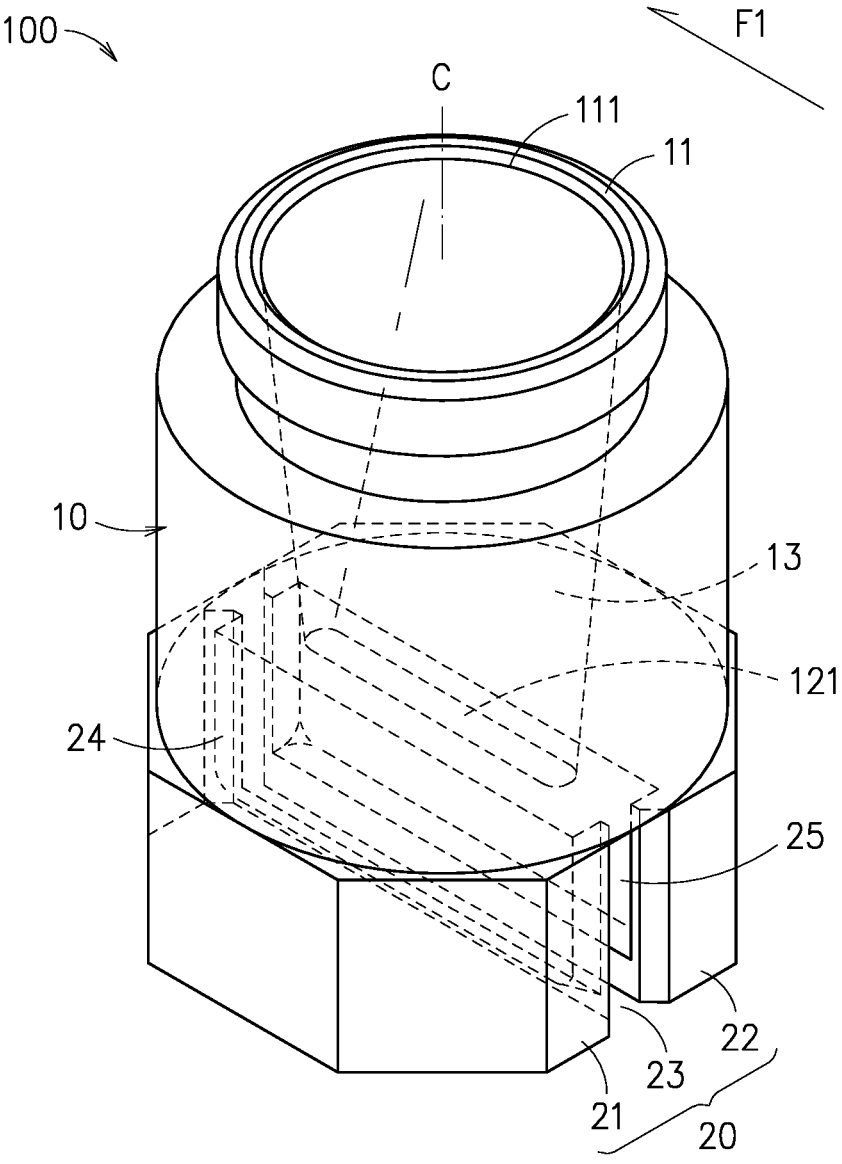
FIG. 1 is a schematic perspective view of an embodiment of the localized heating device in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
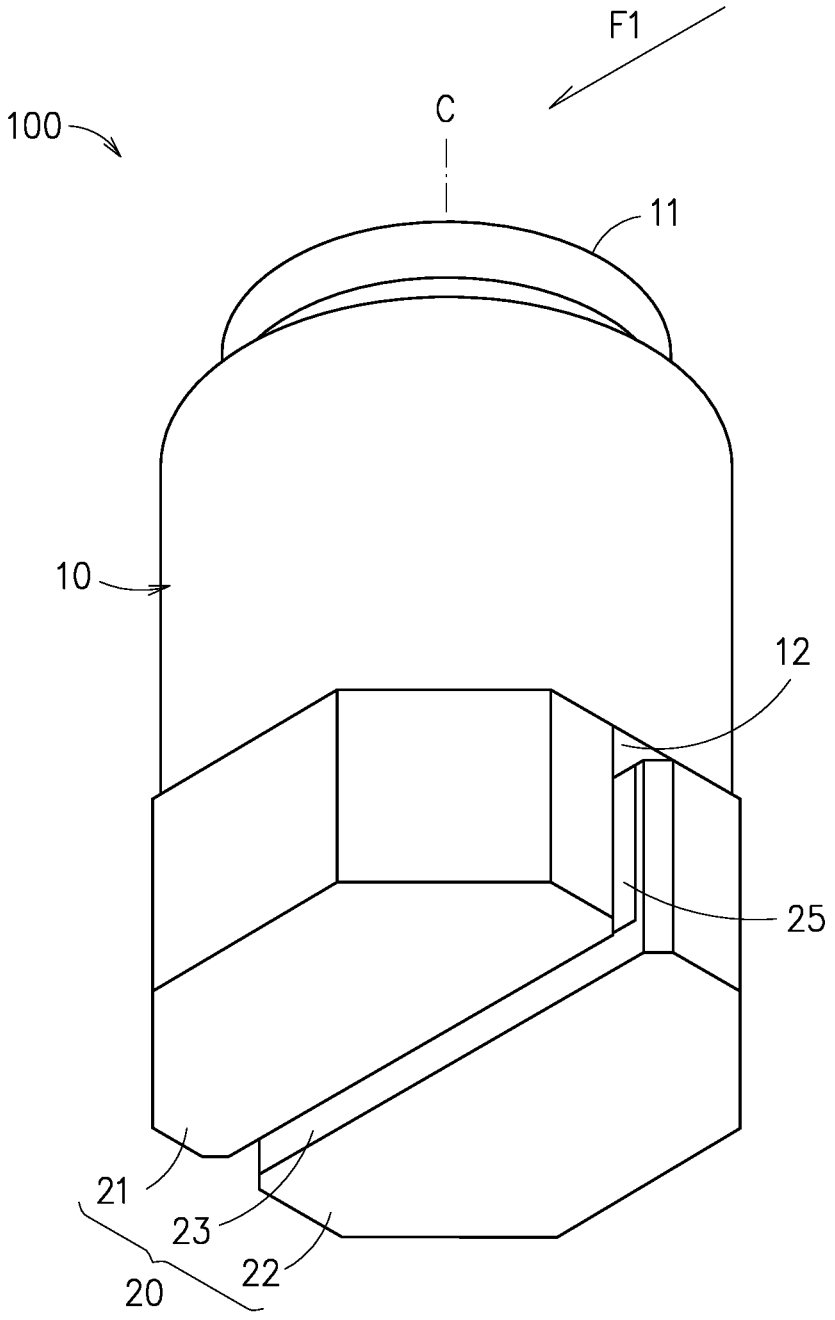
FIG. 2 shows schematically another view of FIG. 1.

Referring to FIG. 1 and FIG. 2, an embodiment of the localized heating device 100 in accordance with this disclosure includes a plasma deforming portion 10 and a heating portion 20.

The plasma deforming portion 10 includes an inlet end 11, an outlet end 12 and a channel 13.

The inlet end 11, having a circular hole 111, is configured for connecting a plasma producing source (not shown in the figure).

Figure 3:
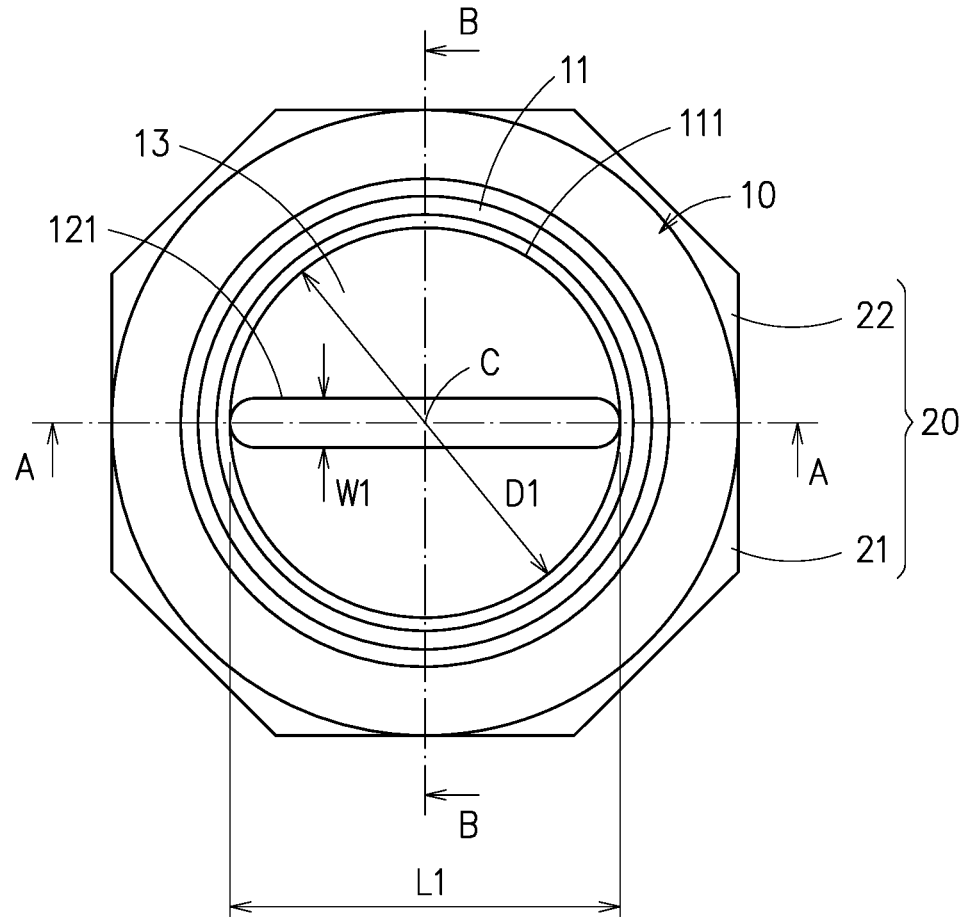
FIG. 3 is a schematic top view of FIG. 1.
Figure 4:
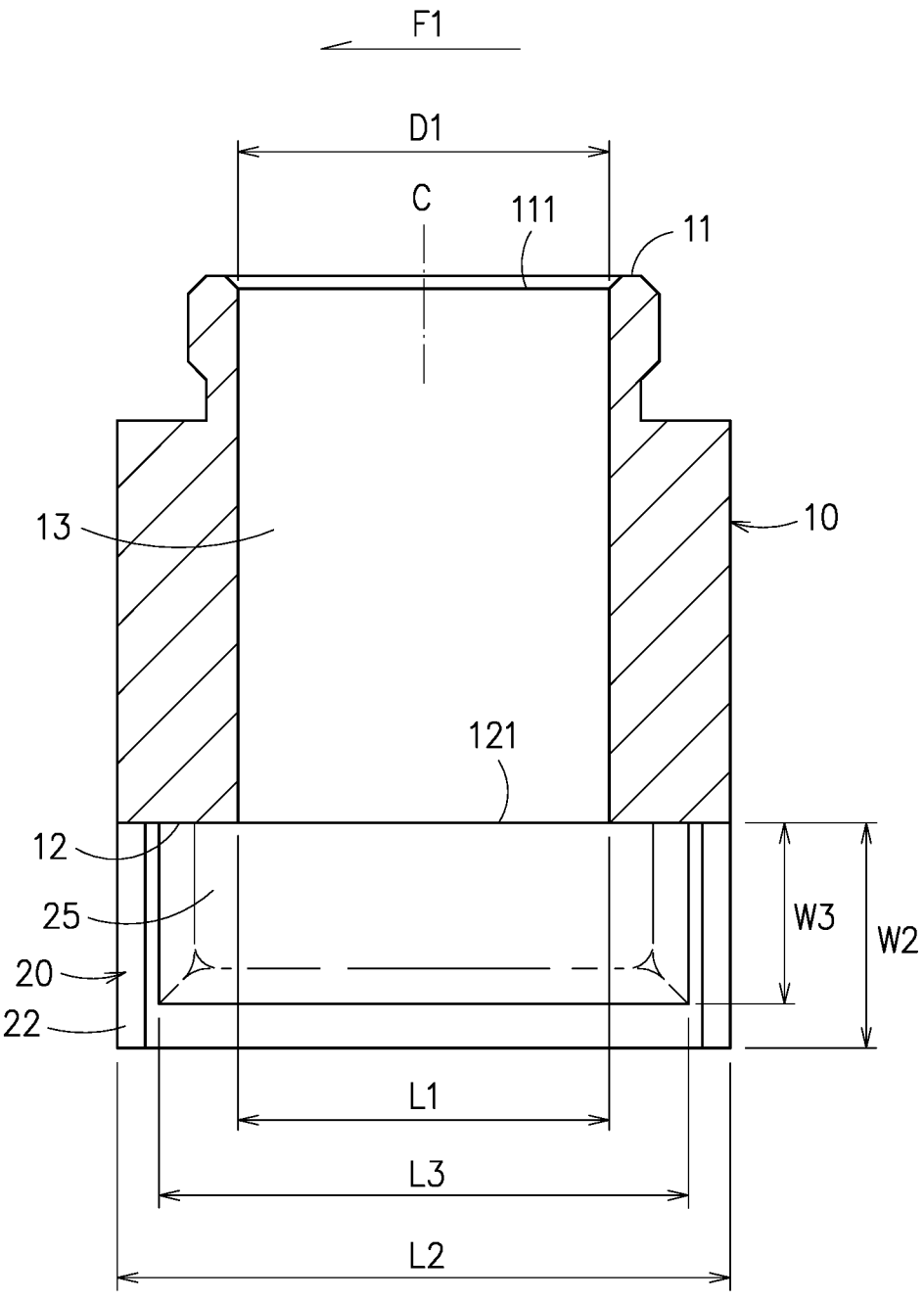
FIG. 4 is a schematic cross-sectional view of FIG. 3 along line A-A.
Figure 4A:
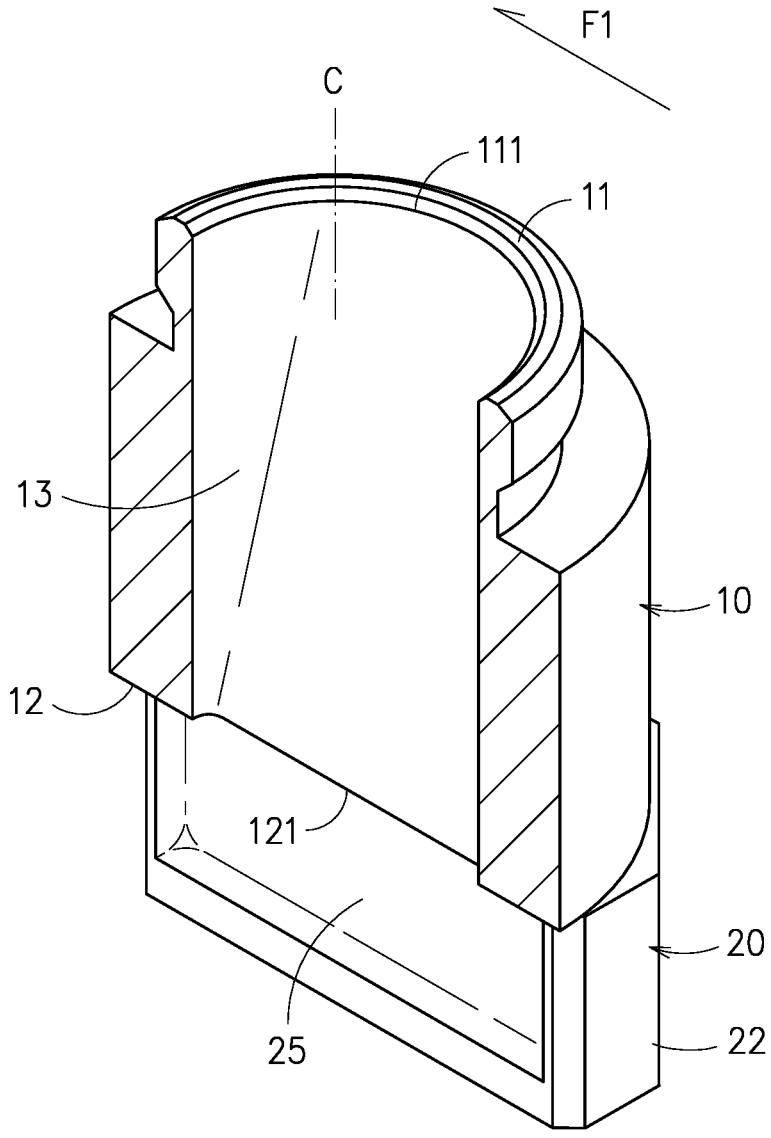
FIG. 4A shows schematically a perspective view of FIG. 4.

Referring to FIG. 3, FIG. 4, FIG. 4A, FIG. 5 and FIG. 5A, the outlet end 12 has an elongated hole 121. The elongated hole 121 is configured to have a first length L1 (as shown in FIG. 4) and a first width W1 (as shown in FIG. 3) perpendicular to each other. The first length L1 is parallel to a first direction F1 perpendicular to an axis C of the circular hole 111.

A diameter D1 of the circular hole 111 is greater or equal to the first length L1.

As shown in FIG. 1, in this embodiment, since the channel 13 is designed to smoothly connect the circular hole 111 and the elongated hole 121, and thus is roughly formed in a flat funnel shape.

The heating portion 20 is consisted of two control covers 21, 22 spaced to each other by a first distance G1; i.e., a slot 23. As shown in FIG. 4, the slot 23 has a second length L2 in the first direction F1, and the first length L1 is less than the second length L2. In addition, the slot 23 has a second width W2 parallel to the axis C.

Figure 5:
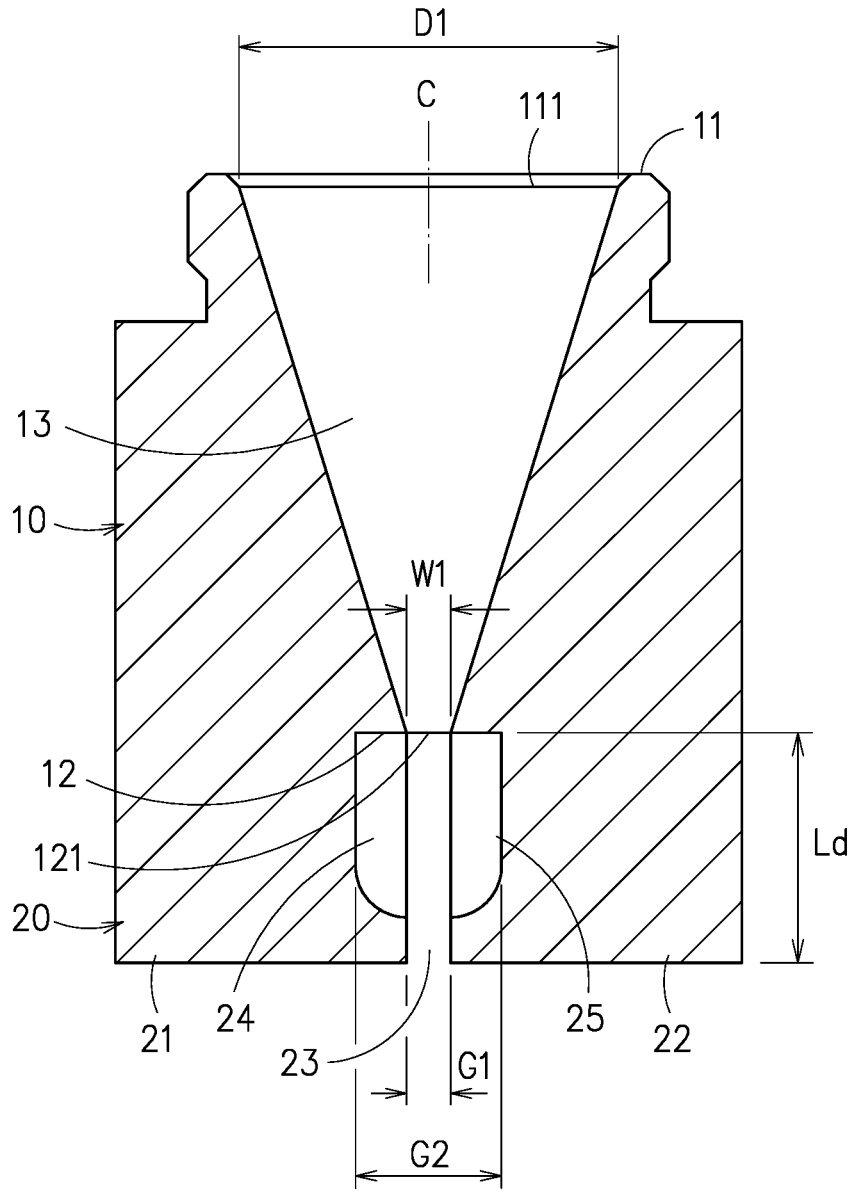
FIG. 5 is a schematic cross-sectional view of FIG. 3 along line B-B.
Figure 5A:
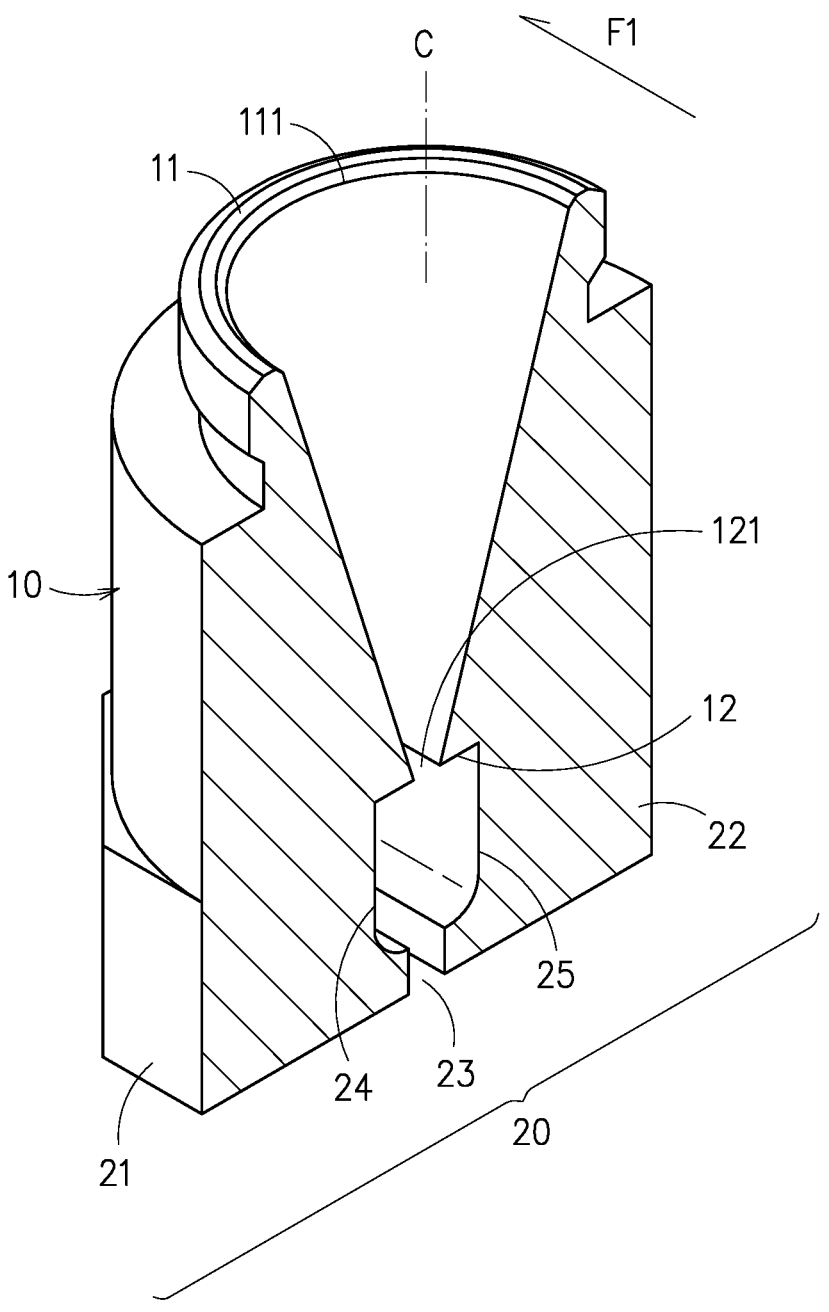
FIG. 5A shows schematically a perspective view of FIG. 5.

As shown in FIG. 5, the two control covers 21, 22 are furnished individually with recess portions 24, 25 facing to each other. The two recess portions 24, 25 is spaced by a second distance G2. Preferably, the second distance G2 is greater than each of the first width W1 and the first distance G1.

As shown in FIG. 4, the two recess portions 24, 25 are configured in rectangular forms and disposed symmetrically to each other. Each of the recess portions 24, 25 has a third length L3 parallel to the first direction F1 and a third width W3 parallel to the axis C. The third length L3 is greater than the first length L1, but less than the second length L2. The third width W3 is less than the second width W2.

The heating portion 20 is disposed at the outlet end 12 of the plasma deforming portion 10. The first length L1 and the second length L2 are parallel to each other, and the elongated hole 121 and the slot 23 are oppositely disposed. Thereupon, the circular hole 111, the channel 13, the elongated hole 121 and the slot 23 are integrated to form a connected spatial path.

Figure 6:
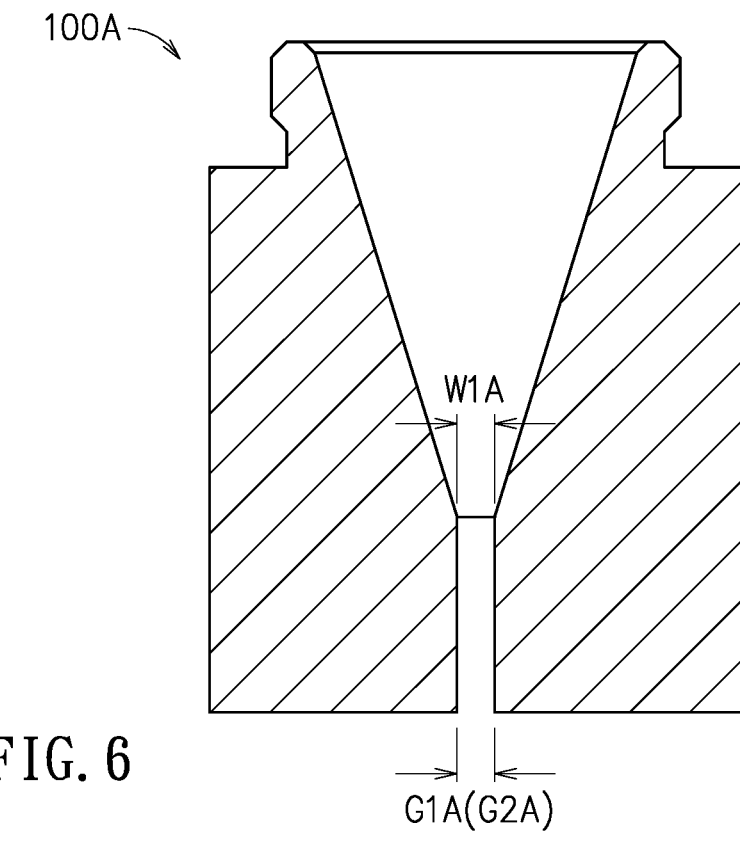
FIG. 6 and FIG. 7 show schematically different cross-sectional views of two other embodiments of the localized heating device in accordance with this disclosure.
Figure 7:
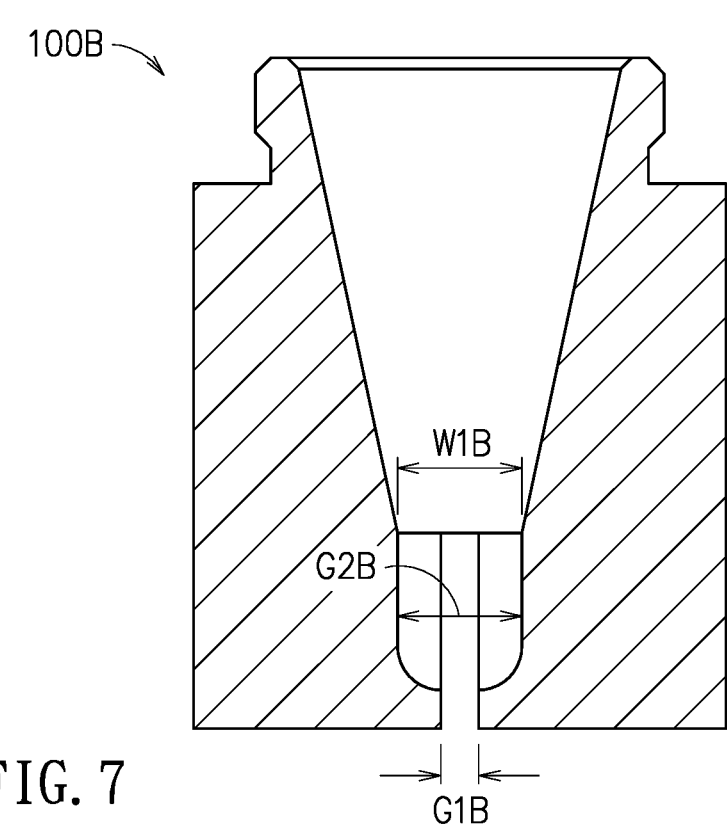

FIG. 6 and FIG. 7 show schematically different cross-sectional views of two other embodiments of the localized heating device in accordance with this disclosure. As shown in FIG. 6, the localized heating device 100A is particularly structured without the recess portions 24, 25 of FIG. 5, and the first distance G1A, the second distance G2A and the first width W1A thereof are all the same.

Referring to FIG. 7, in this embodiment, the second distance G2B of the localized heating device 100B is equal to the first width W1B, and the first distance G1B thereof is less than the second distance G2B.

Figure 8:
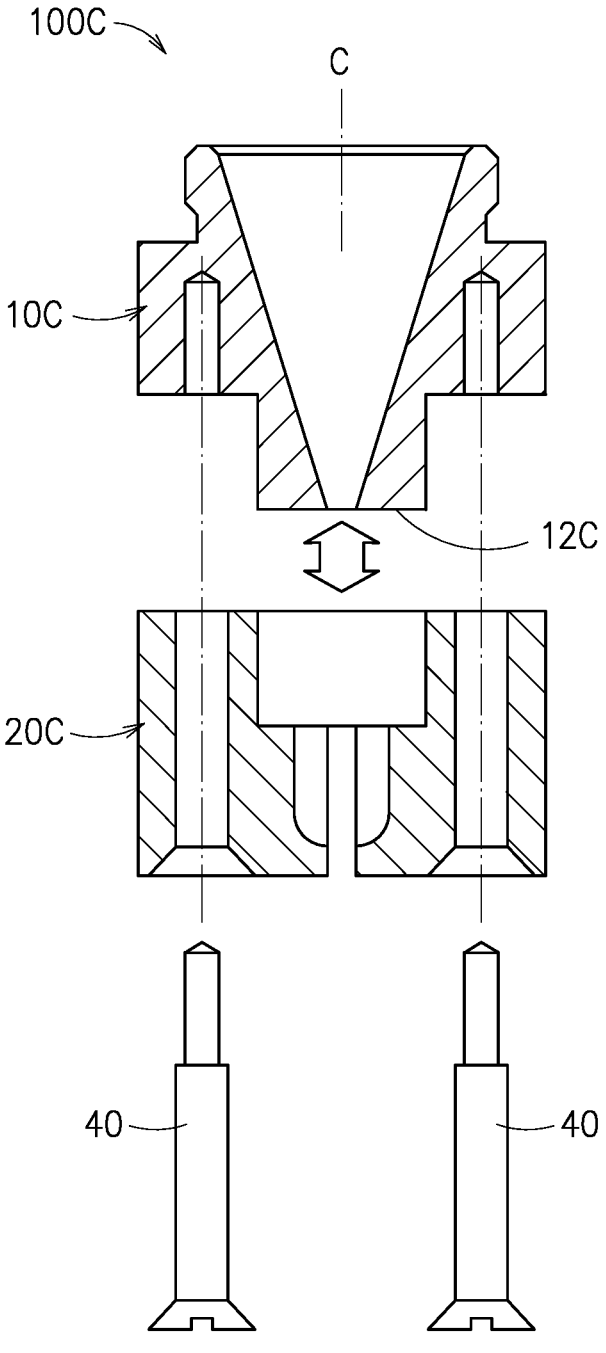
FIG. 8 shows schematically how the heating portion can be adjustable to engage the plasma deforming portion in accordance with this disclosure.
Figure 8A:
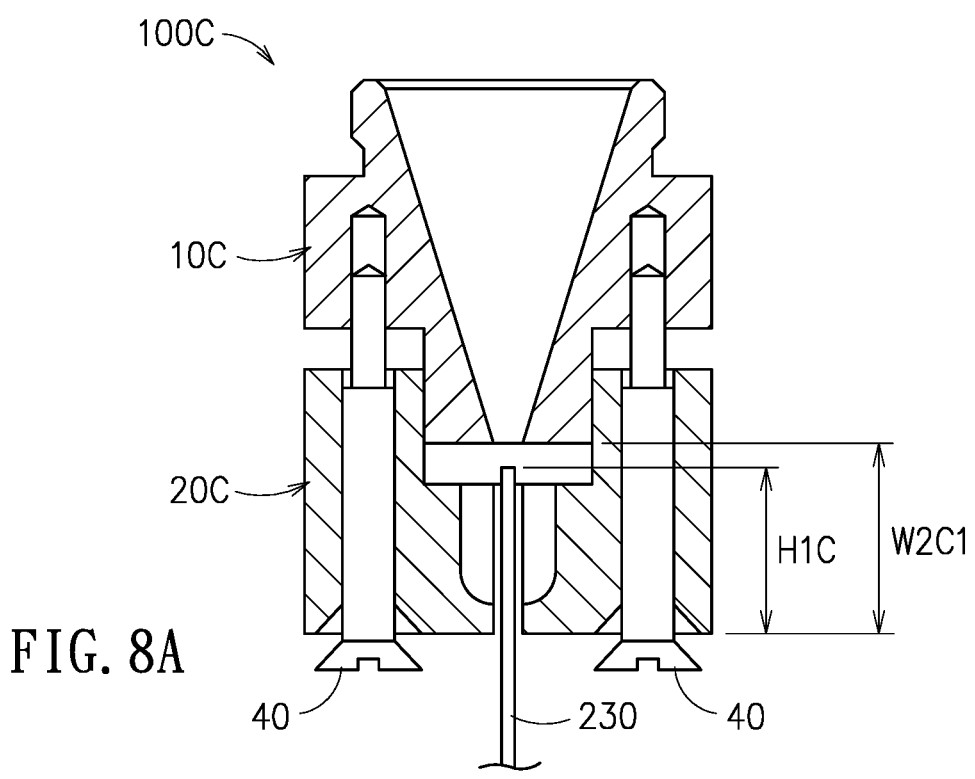
FIG. 8A and FIG. 8B show schematically different states of FIG. 8.
Figure 8B:
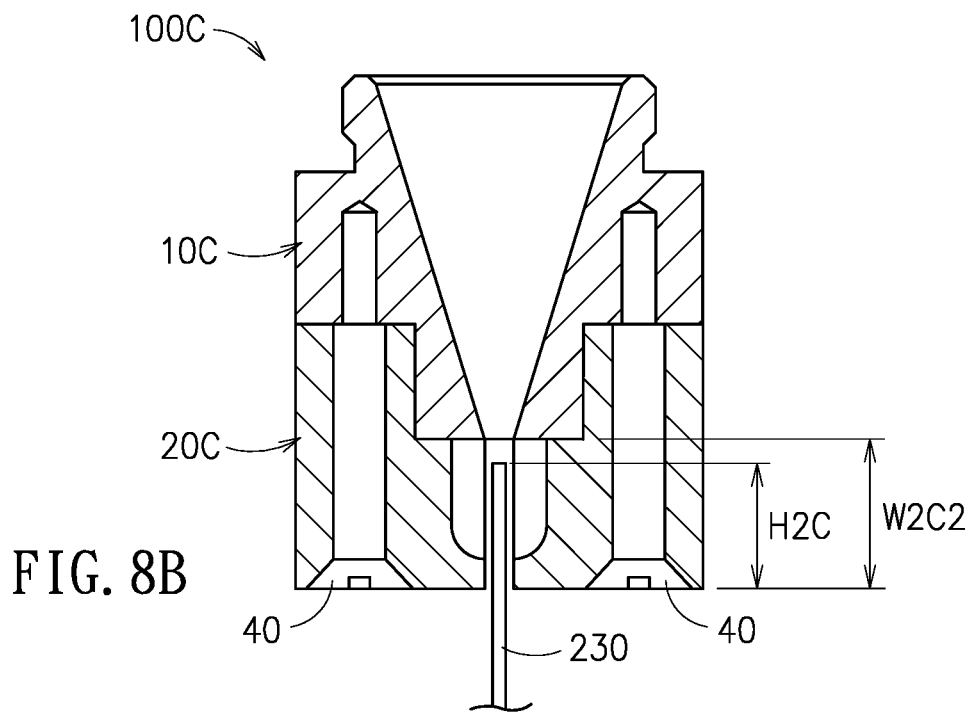

FIG. 8 shows schematically how the heating portion can be adjustable to engage the plasma deforming portion in accordance with this disclosure, and FIG. 8A and FIG. 8B show schematically different states of FIG. 8. As shown, in this embodiment, the localized heating device 100C, structured as a two-piece parts, has a heating portion 20C parallel to the axis C, and is adjustable to engage, by sleeving, an outlet end 12C of a plasma deforming portion 10C. The heating portion 20C and the plasma deforming portion 10C can be fixed together by screw bolts 40 (as shown in the figure), clips, hooks, screws or any the like.

FIG. 8A and FIG. 8B demonstrate schematically different states of the localized heating device 100C, where the screw bolts 40 are applied in different depths; i.e., W2C1 and W2C2, respectively. Practically, the engaged depth thereof is determined according to practical needs.

Figure 9:
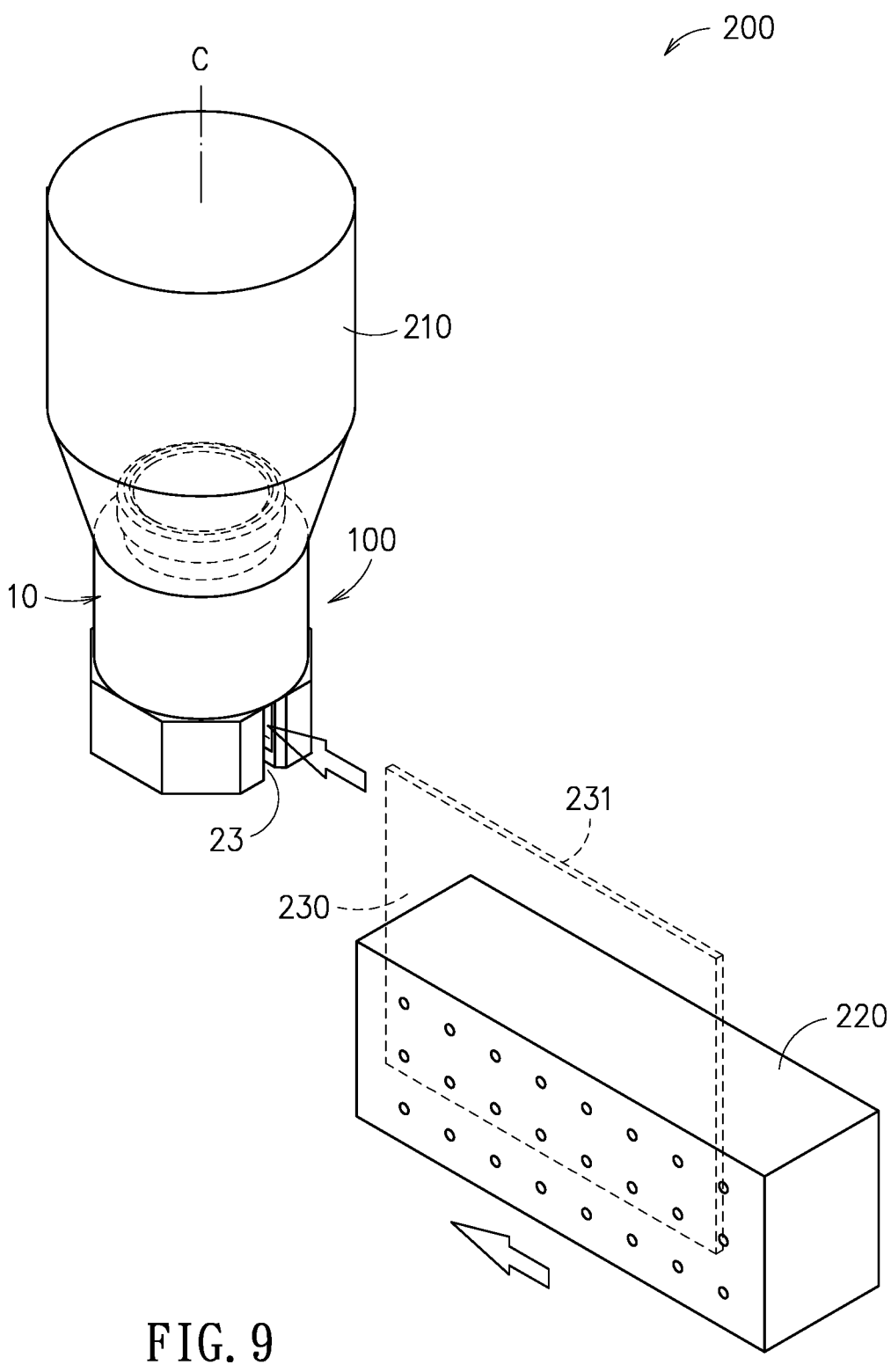
FIG. 9 is a schematic view of an embodiment of the localized heating system in accordance with this disclosure.
Figure 10A:
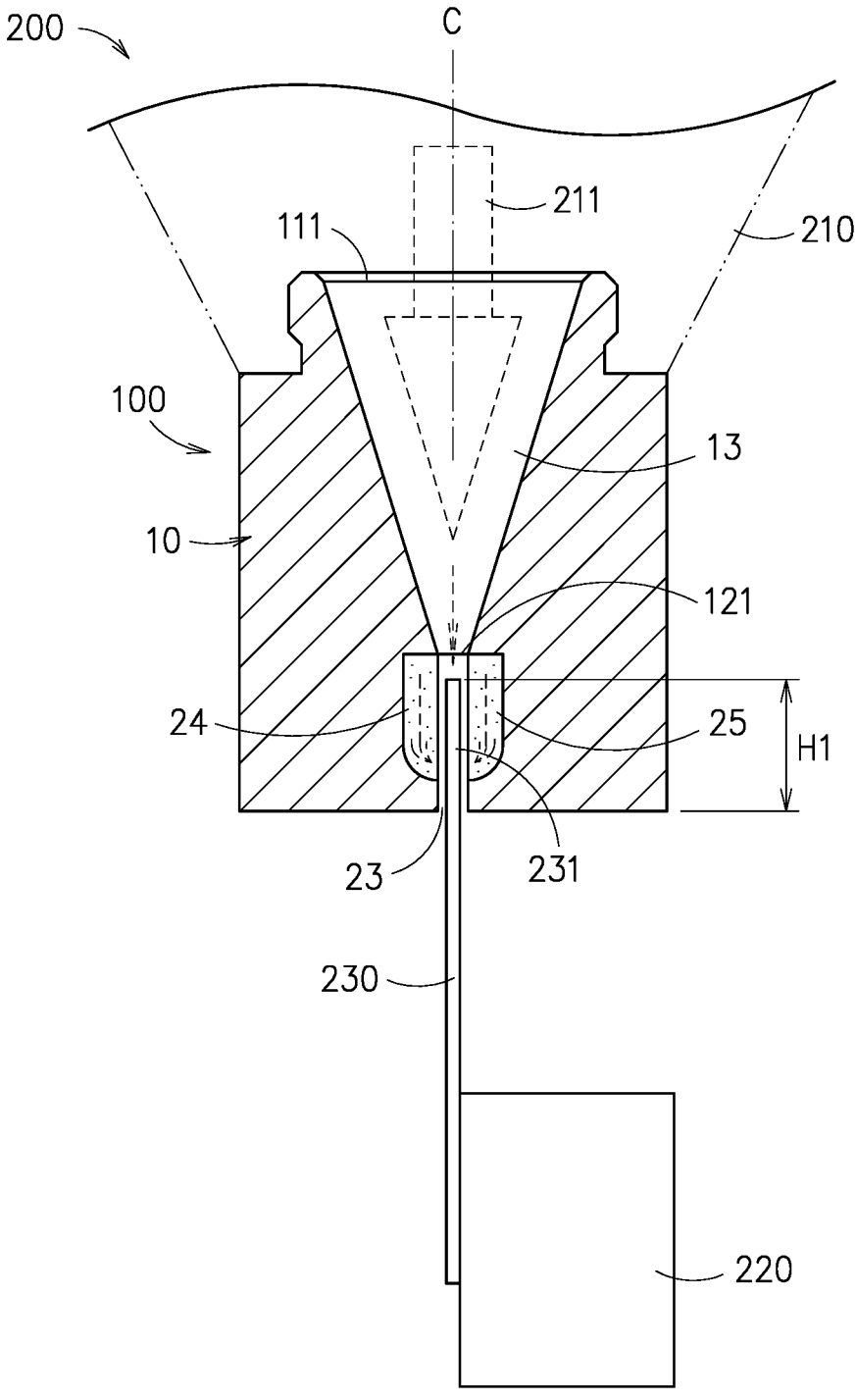
FIG. 10A and FIG. 10B show schematically two states of a workpiece protruded into the slot at different depths in accordance with this disclosure.

Referring to FIG. 9 and FIG. 10A, in this embodiment, a localized heating system 200 includes a plasma producing source 210, a localized heating device 100 and a fixture 220.

The plasma producing source 210 is configured to provide a plasma flow. The plasma deforming portion 10 of the localized heating device 100 is connected with the plasma producing source 210. The fixture 220, provided with a workpiece 230 in the figure, can be driven to displace an edge 231 of the workpiece 230 to be parallel to the axis C so as to enter the slot 23 by a depth H1 into the localized heating device 100 for receiving a plasma treatment.

As shown individually in FIG. 8A and FIG. 8B, as the screw bolts 40 are applied in different depths H1C, H2C, respectively, the second widths W2C1, W2C2 can be correspondingly formed. As the second widths W2C1, W2C2 are different, the engaged depths H1C, H2C of the workpiece entering the heating portion 20C would be different as well. Thereupon, the localized heating device 100C can be suitable to diverse work ranges.

It shall be explained that the fixture 220 might have various exemplary examples, such as a vacuum device or a clip device to handle the workpiece 230. In addition, the fixture 220 can be driven by a mechanical device, an electric device or an electronic device.

Further, the workpiece 230 can be a simple substrate, a composite substrate or a plurality of substrates. For example, if the workpiece includes a plurality of glass-made substrates, these substrates can be firstly cleaned thoroughly, and then firmly adhered together to form an integrated workpiece by natural adhesion to each other.

As shown in FIG. 10A, in this embodiment, the plasma 211 provided by the plasma producing source 210 enters the channel 13 via the circular hole 111, passes through the elongated hole 121, and then reaches the slot 23. In the slot 23, the edge 231 of the workpiece 230 is heated by the plasma 211. In this embodiment, the plasma 211 is originally provided in a bundle shape, but would be rectified into a shape of long flat strip after passing the elongated hole 121. The fixture 220 is applied to send the workpiece 230 into the slot 23 for the edge 231 thereof to receive the high-temperature heating treatment by the plasma 211, such that the edge of the workpiece including individual edges of a plurality of substrates can be melted to join each other. If the workpiece 230 is a single substrate, then the edge of the substrate can be modified in the slot 23. In this disclosure, the recess portions 24, 25 can be applied to accumulate heat of the plasma 211 for enhancing thermal efficiency.

Figure 10B:
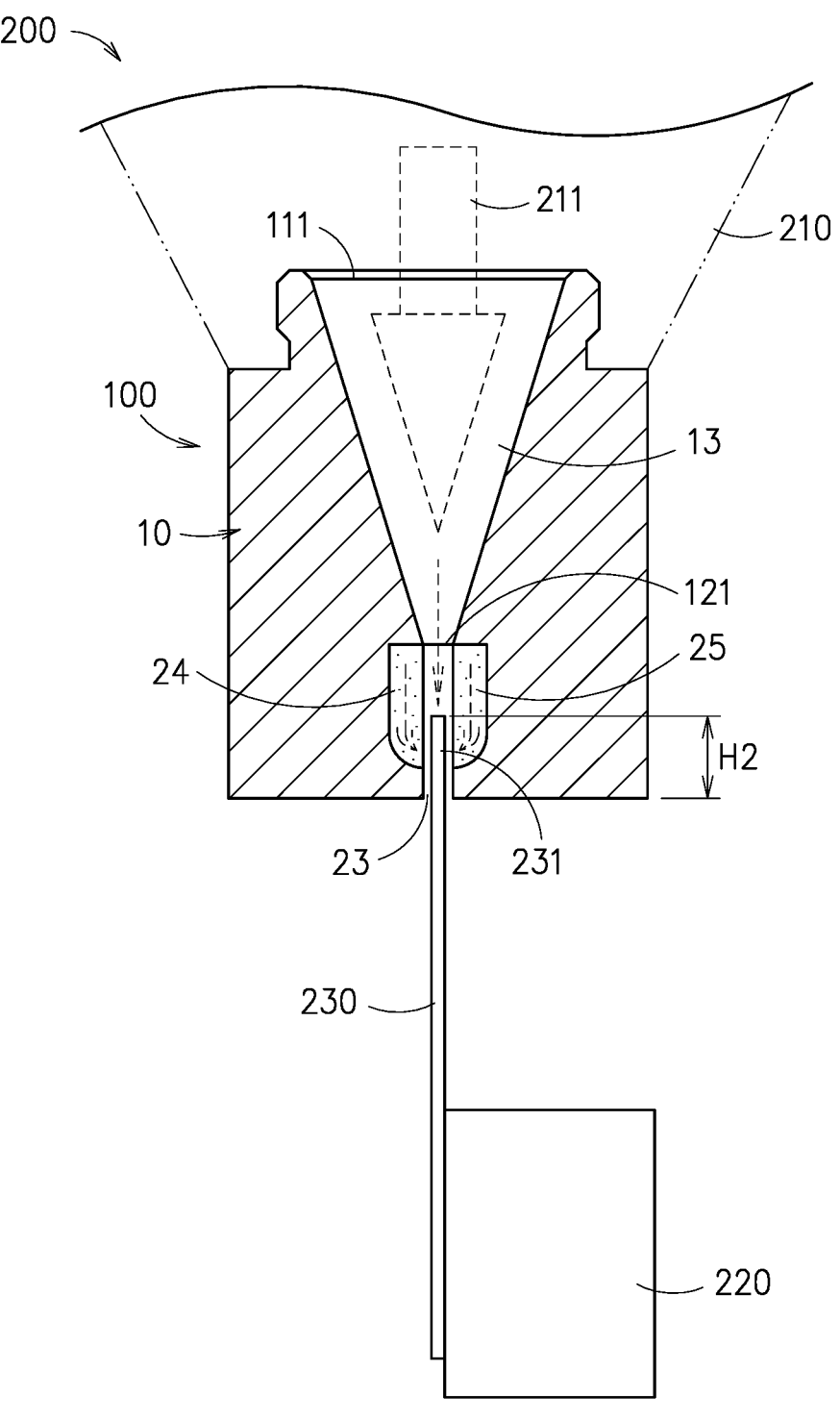

Referring to FIG. 10B, it shows that the edge 231 of the workpiece 230 are protruded into the slot 23 by a smaller depth H2, compared to the depth H1 of FIG. 10A. In comparison between FIG. 10A and FIG. 10B, since the substrate of FIG. 10A is closer to the plasma entrance, thus the associated thermal effected region of the substrate would be broader and the heating temperature would be higher. On the other hand, since the substrate of FIG. 10B is slightly distant to the plasma entrance, thus the associated thermal effected region of the substrate would be narrower and the heating temperature would be comparatively lower. Obviously, it is one of many features of this disclosure that the thermal effected region and the heating temperature of the workpiece are adjustable according to practical requirements.

In addition, in some other embodiments, the localized heating device 100 of the localized heating system 200 of FIG. 9 can be replaced by any of the localized heating devices 100A-100C of FIG. 6-FIG. 8.

To sum up, the localized heating device and the localized heating system having the same provided in the present disclosure, the originally bundled plasma can be rectified into a long flat strip, and a special slot-type heating portion is introduced to perform a high-speed and high-temperature treatment (for example, higher than 1000° C.) locally upon the substrate(s) by a wider plasma flow. Thus, other parts of the substrate away from the slot would be free from possible stress cracking due to temperature differences. Compared with the conventional pressing technology which is time-consuming and energy-consuming, the present disclosure can significantly save the energy, and provide a better heating effect. The present disclosure has a wider range of applications, is suitable for substrate packaging, local processing of substrates and bonding of substrates, and includes defect repair, molding and polishing. In particular, while in performing local packaging on the edge(s) of the substrate(s), the thermal-sensitive coating or design at the non-processing area of the substrate(s) would be free of thermal damages.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A localized heating device, comprising:

a plasma deforming portion, including:

an inlet end, having a circular hole, connected with a plasma producing source;

an outlet end, having an elongated hole, the elongated hole having a first length and a first width perpendicular to each other, the first length being parallel to a first direction, the first direction and an axis of the circular hole being perpendicular to each other; and a channel, connected with the circular hole and the elongated hole; and a heating portion, including two control covers, the two control covers being spaced to each other by a slot having a first distance, the slot having a second length parallel to the first direction, the slot being parallel to the axis and having a second width, the heating portion being disposed at the outlet end of the plasma deforming portion, the first length and the second length being parallel to each other, the elongated hole and the slot being oppositely disposed, a plasma flow provided by the plasma producing source being to enter the channel via the circular hole, then to flow through the elongated hole, and finally to reach the slot, wherein the heating portion is adjustably engaged with the outlet end of the plasma deforming portion by being parallel to the axis, so as to vary the second width.

2. The localized heating device of claim 1, wherein the two control covers are furnished individually with recess portions to face each other.

3. The localized heating device of claim 2, wherein the two recess portions are spaced by a second distance, and the second distance is greater than the first width, and the second distance is also greater than the first distance.

4. The localized heating device of claim 2, wherein the two recess portions are configured as opposite rectangles, each of the recess portions has a third length parallel to the first direction and a third width parallel to the axis, the third length is greater than the first length but less than the second length, and the third width is less than the second width.

5. The localized heating device of claim 1, wherein a diameter of the circular hole is greater than or equal to the first length.

6. The localized heating device of claim 1, wherein the first length is less than the second length.

7. A localized heating system, comprising:

a plasma producing source, providing a plasma flow;

a localized heating device, including:

a plasma deforming portion, including:

an inlet end, having a circular hole, connected with a plasma producing source;

an outlet end, having an elongated hole, the elongated hole having a first length and a first width perpendicular to each other, the first length being parallel to a first direction, the first direction and an axis of the circular hole being perpendicular to each other; and a channel, connected with the circular hole and the elongated hole; and a heating portion, including two control covers, the two control covers being spaced to each other by a slot having a first distance, the slot having a second length parallel to the first direction, the slot being parallel to the axis and having a second width, the heating portion being disposed at the outlet end of the plasma deforming portion, the first length and the second length being parallel to each other, the elongated hole and the slot being oppositely disposed, a plasma flow provided by the plasma producing source being to enter the channel via the circular hole, then to flow through the elongated hole, and finally to reach the slot; and a fixture, configured for loading a workpiece, driven to displace an edge of the workpiece to enter the slot for undergoing a plasma treatment.

8. The localized heating system of claim 7, wherein the two control covers are furnished individually with recess portions to face each other.

9. The localized heating system of claim 8, wherein the two recess portions are spaced by a second distance, and the second distance is greater than the first width, and the second distance is also greater than the first distance.

10. The localized heating system of claim 8, wherein the two recess portions are configured as opposite rectangles, each of the recess portions has a third length parallel to the first direction and a third width parallel to the axis, the third length is greater than the first length but less than the second length, and the third width is less than the second width.

11. The localized heating system of claim 7, wherein a diameter of the circular hole is greater than or equal to the first length.

12. The localized heating system of claim 7, wherein the first length is less than the second length.

13. The localized heating system of claim 7, wherein the heating portion is adjustably engaged with the outlet end of the plasma deforming portion by being parallel to the axis, so as to vary the second width.

* * * * *